United States Patent [19]
Asghar et al.

[11] Patent Number: 6,032,116
[45] Date of Patent: Feb. 29, 2000

[54] DISTANCE MEASURE IN A SPEECH RECOGNITION SYSTEM FOR SPEECH RECOGNITION USING FREQUENCY SHIFTING FACTORS TO COMPENSATE FOR INPUT SIGNAL FREQUENCY SHIFTS

[75] Inventors: Safdar M. Asghar; Lin Cong, both of Austin, Tex.

[73] Assignee: Advanced Micro Devices, Inc., Sunnyvale, Calif.

[21] Appl. No.: 08/883,980

[22] Filed: Jun. 27, 1997

[51] Int. Cl.⁷ ..................................................... G10L 7/08
[52] U.S. Cl. ............................................................. 704/238
[58] Field of Search .................................... 704/238, 236, 704/209, 207, 206, 276, 205

[56] References Cited

U.S. PATENT DOCUMENTS

| | | | |
|---|---|---|---|
| 4,383,135 | 5/1983 | Scott et al. | 704/236 |
| 4,519,094 | 5/1985 | Brown et al. | 704/243 |
| 4,933,973 | 6/1990 | Porter | 704/233 |
| 4,975,955 | 12/1990 | Taguchi | 704/219 |
| 5,031,217 | 7/1991 | Nishimura | 381/43 |
| 5,046,099 | 9/1991 | Nishimura | 704/256 |
| 5,185,848 | 2/1993 | Aritsuka et al. | 704/202 |
| 5,228,087 | 7/1993 | Bickerton | 704/232 |
| 5,255,339 | 10/1993 | Fette et al. | 704/200 |
| 5,285,522 | 2/1994 | Mueller | 704/232 |
| 5,313,555 | 5/1994 | Kamiya | 704/233 |
| 5,414,796 | 5/1995 | Jacobs et al. | 395/2.3 |
| 5,583,888 | 12/1996 | Ono | 375/240 |
| 5,596,679 | 1/1997 | Wang | 704/236 |
| 5,625,747 | 4/1997 | Goldberg et al. | 704/243 |
| 5,696,878 | 12/1997 | Ono et al. | 704/250 |
| 5,734,793 | 3/1998 | Wang | 704/232 |

OTHER PUBLICATIONS

Xydeas, C.S. Prof. and Cong, Lin "Robust Speech Recognition Using Fuzzy Matrix Quantisation, Neural Networks and Hidden Markov Models" Sep. 1996, pp. 1587–1590.

Cong, Ling, Xydeas, Costas S. Prof. and Ferwood, Anthony F. Combining Fuzzy Vector Quantization and Neural Network Classification for Robust Isolated Word Speech Recognition: Singapore ICCS 1994, pp. 884–887.

Parsons, Thomas W., "Voice and Speech Processing"; McGraw–Hill, Inc., New York, 1987; pp. 170–171.

Xydeas, C.S. and Lin Cong; "Robust Speech Recognition Using Fuzzy Matrix Quantization and Neural Networks"; Proceedings of International Conference on Communication Technology; Beijing, China—ICCT '96; pp. 432–435; IEEE; New York (May 5–7, 1996).

(List continued on next page.)

*Primary Examiner*—David R. Hudspeth
*Assistant Examiner*—Donald L. Storm
*Attorney, Agent, or Firm*—Skjerven, Morrill, MacPherson, Franklin & Friel, LLP; Kent B. Chambers

[57] ABSTRACT

One embodiment of a speech recognition system is organized with speech input signal preprocessing and feature extraction followed by a fuzzy matrix quantizer (FMQ). Frames of the speech input signal are represented by a vector $f$ of line spectral pair frequencies and are fuzzy matrix quantized to respective a vector $\hat{f}$ entries in a codebook of the FMQ. A distance measure between $f$ and $\hat{f}$, $d(f,\hat{f})$, is defined as $$d(f, \hat{f}) = \sum_{i=1}^{Ni} \alpha_1 \left[ (f_i - e_i^{\beta_1} - \hat{f}_i) \right]^2 + \sum_{i=Ni+1}^{P} \alpha_2 \left[ (f_i - \hat{f}_i) e_i^{\beta_2} \right]^2$$

where the constants $\alpha_1$, $\alpha_2$, $\beta_1$ and $\beta_2$ are set to substantially minimize quantization error, and $e_i$ is the error power spectrum of the speech input signal and a predicted speech input signal at the ith line spectral pair frequency of the speech input signal. The speech recognition system may also include hidden Markov models and neural networks, such as a multilevel perceptron neural network, speech classifiers.

36 Claims, 7 Drawing Sheets

OTHER PUBLICATIONS

Xydeas, C.S. and Cong, Lin; "Speech Robust Recognition Using Fuzzy Matrix Quantization, Neural Networks and Hidden Markov Models"; Proc. of EUSIPCO–96; Eighth Eur. Sig. Proc. Conf.: Theory and Appl. of Sig Proc, v3; pp. 1587–1590; Treiste, Italy (Sep. 10–13, 1996).

Cong, Lin; "A Study of Robust IWSR Systems"; PhD Thesis submitted to The University of Manchester School of Engineering, Division of Electrical Engineering; Manchester, United Kingdom; pp. 1–209. May 1996.

Waibel, Alexander; "Neural Network Approaches for Speech Recognition"; Chapter 18 of *Advances in Speech Signal Processing;* edited by Sadaoki Furui and M. Mohan Sondhi; Marcel Dekker, Inc.; New York, New York; 1992; pp. 555–595.

Xydeas, C. S. and Cong, L.; "Combining Neural Network Classification with Fuzzy Vector Quantization and Hidden Markov Models for Robust Isolated Word Speech Recognition"; *Signal Processing VIII Theories and Applications,* vol. III; Proceedings for the IEEE International Symposium on Information Theory, IEEE Press, 1995, p. 174.

Xydeas, C. S. and Cong, L. "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook;* Editor–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing;* edited by Sadaoki Furui and M. Mohan Sondhi; Marcel Dekker, New York, Inc.; New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing;* edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing;* edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing;* edited by Sadaoki Furui and M. Mohan Sondhi; Marcel Dekker, Inc.; New York, New York; 1992; pp. 231–268.

Lawrence Rabiner and Biing–Hwang Juang, "Fundamentals of Speech Recognition," Prentice Hall PTR (Englewood Cliffs, New Jersey, 1993), pp. 190–195.

| FIG. 3A | FIG. 3B | FIG. 3C | FIG. 3D |

FIG. 3

1. Training
1'. Training
2. Recognition

wherein in one embodiment a distance measure, $d(f,\hat{f})$, between the speech input signal, $f$, and the reference speech signal, $\hat{f}$, is defined by, as determined in operations 402-408:

$$d(f,\hat{f}) = \sum_{i=1}^{N_1} \alpha_1 \left[ (f_i - e_i^{\beta_1} \hat{f}_i) \right]^2 + \sum_{i=N_1+1}^{P} \alpha_2 \left[ (f_i - \hat{f}_i) e_i^{\beta_2} \right]^2$$

wherein $f_i$ and $\hat{f}$ are the $i$th line spectral pair frequencies in the speech input signal and the reference speech signal, respectively, the constants $\alpha 1$, $\alpha 2$, $\beta 1$ and $\beta 2$ are set to substantially minimize quantization error, and $e_i$ is the error power spectrum of the speech input signal and a predicted speech input signal at the $i$th line spectral pair frequency of the speech input signal, wherein $\alpha 1$, $\alpha 2$, $\beta 1$ and $\beta 2$ are, for example, set to 1.6, .68, .5, and .25, respectively and wherein the $i=1$ to N1 line spectral pair frequencies are, for example, in the 0 to 400 Hz range.

*FIG. 4B*

DISTANCE MEASURE IN A SPEECH RECOGNITION SYSTEM FOR SPEECH RECOGNITION USING FREQUENCY SHIFTING FACTORS TO COMPENSATE FOR INPUT SIGNAL FREQUENCY SHIFTS

BACKGROUND OF THE INVENTION

1. Field of the Invention

This invention relates to speech recognition systems and more particularly to speech recognition systems having quantizers employing a robust distance measure.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the speech input signal with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

Figure 1:
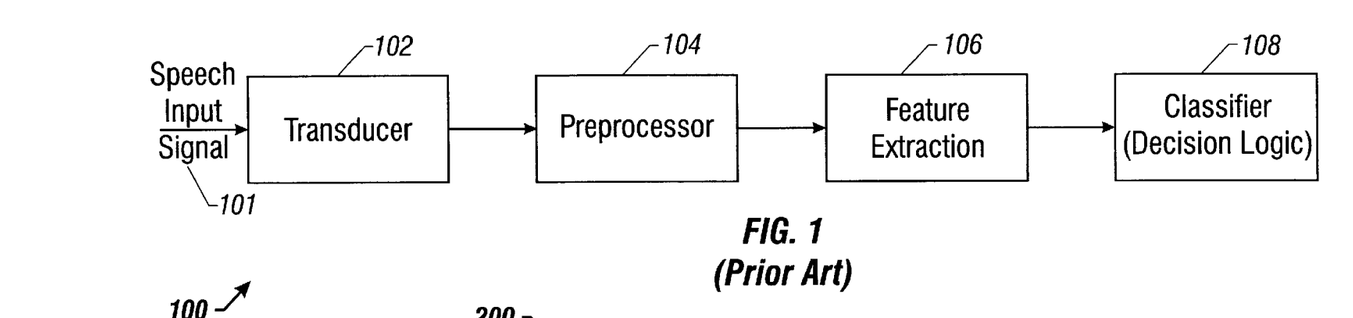
FIG. 1, labeled prior art, illustrates a general speech recognition system.

FIG. 1 generally characterizes a speech recognition process by the speech recognition system 100. A microphone transducer 102 picks up a speech input signal and provides to signal preprocessor 104 an electronic signal representation of the composite speech input signal 101. The speech input signal 101 is an acoustic waveform of a spoken input, typically a word, or a connecting string of words. The signal preprocessor 104 may, for example, filter the speech input signal 101, and a feature extractor 106 extracts selected information from the speech input signal 101 to characterize the signal with, for example, cepstral frequencies or line spectral pair frequencies (LSPs).

Figure 2:
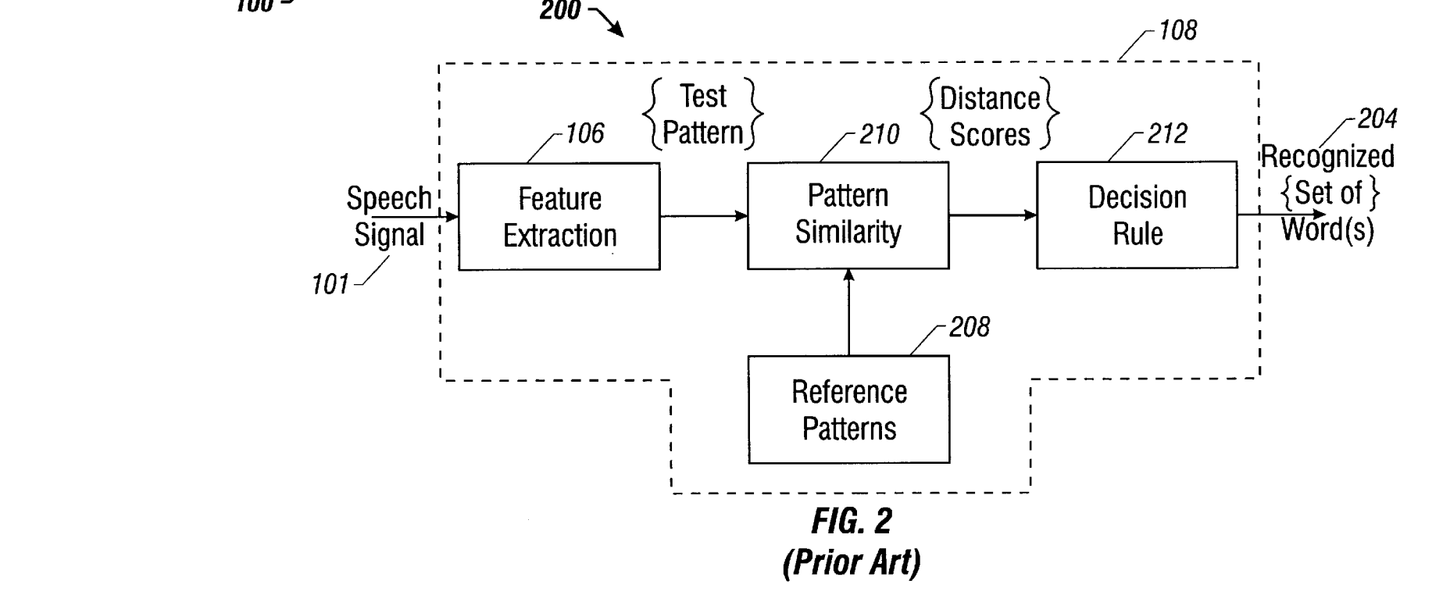
FIG. 2 illustrates a pattern-recognition based speech recognition system.

Referring to FIG. 2, more specifically, feature extraction in operation 106 is basically a data-reduction technique whereby a large number of data points (in this case samples of the speech input signal 101 recorded at an appropriate sampling rate) are transformed into a smaller set of features which are "equivalent", in the sense that they faithfully describe the salient properties of the speech input signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds (ms). Thus, short-time speech input signal portion of speech input signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates a speech input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 ms, to represent the changing vocal tract. LP prediction coefficients are calculated using a variety of well-known procedures, such as autocorrelation and covariance procedures, to minimize the difference between the actual speech input signal 101 and a predicted speech input signal 101 often stored as a spectral envelope reference pattern. The LP prediction coefficients can be easily transformed into several different representations including cepstral coefficients and line spectrum pair (LSP) frequencies. Details of LSP theory can be found in N. Sugamura, "Speech Analysis and Synthesis Methods Developed at ECL in NTT—from LPC to LSP", Speech Communication 5, Elsevier Science Publishers, B. V., pp. 199–215 (1986).

Final decision-logic classifier 108 utilizes the extracted information to classify the represented speech input signal to a database of representative speech input signals. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing speech input signal 101 are segmented into short-term speech input signal frames and considered to be stationary within each frame for 10 to 30 msec duration. The extracted features may be represented by a P-dimensional vector and compared with predetermined, stored reference patterns 208 by the pattern similarity operation 210. Similarity between the speech input signal 101 pattern and the stored reference patterns 208 is determined in pattern similarity operation 210 using well-known vector quantization processes. The vector quantization process yields spectral distortion or distance measures to quantify the score of fitness or closeness between the representation of speech input signal 101 and each of the stored reference patterns 208.

Several types of spectral distance measures have been studied in conjunction with speech recognition including LSP based distance measures such as the LSP Euclidean distance measure (dLSP) and weighted LSP Euclidean distance measure (dWLSP). They are defined by $$dLSP = \sum_{i=1}^{P} (f_R(i) - f_S(i))^2$$

and $$dWLSP = \sum_{i=1}^{P} w(i)(f_R(i) - f_S(i))^2$$

where, $f_R(i)$ and $f_S(i)$ are the ith LSPs of the reference and speech vectors, respectively. The factor "w(i)" is the weight assigned to the ith LSP and P is the order of LPC filter. The weight factor w(i) is defined as:

$$w(i) = [P(f_S(i))]^r$$

where P(f) is the LPC power spectrum associated with the speech vector as a function of frequency, f, and r is an empirical constant which controls the relative weights given to different LSPs. In the weighted Euclidean distance measure, the weight assigned to a given LSP is proportional to the value of LPC power spectrum at this LSP frequency.

The decision rule operation 212 receives the distance measures and determines which of the reference patterns 208 the speech input signal 101 most closely represents. In a "hard" decision making process, speech input signal 101 is matched to one of the reference patterns 208. This one-to-one "hard decision" ignores the relationship of the speech input signal 101 to all the other reference patterns 208. Fuzzy methods have been introduced to provide a better match between vector quantized frames of speech input signal 101 and reference patterns 208. In a "soft" or "fuzzy" decision making process, speech input signal 101 is related to one or more reference patterns 208 by weighting coefficients.

Matrix quantization has also been used to introduce temporal information about speech input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of speech input signal 101.

Although band limited input distortion affects only a subset of LSP coefficients, as compared to the case of a cepstral representation where input noise corrupts all the coefficients, the affected subset still contributes quantization noise to the speech recognition system. Accordingly, a need exists to provide a more robust distance measure.

SUMMARY OF THE INVENTION

In one embodiment, a speech recognition system utilizes a robust distance measure to adapt to predetermined or dynamically determined acoustic noise by frequency weighting and frequency shifting spectral distance measures. In another embodiment, when speech is corrupted in a generally low frequency noise environment such as an automotive environment, low frequency LSP distance measure components are selectively shifted and high frequency LSP distance measure components are selectively weighted. This robust LSP distance measure may enhance the accuracy of speech recognition systems such as FMQ/HMM/MLP, FVQ/HMM/MLP, FMQ/HMM, FVQ/HMM, FMQ/MLP, FVQ/MLP, non-fuzzy corresponding systems, and generally any other system using line spectral pair distance measures.

In another embodiment of the present invention, a speech recognition system includes a quantizer for determining a distance measure between an ith speech input signal line spectral pair frequency and an ith reference speech signal line spectral pair frequency, wherein the distance measure, for i=1 to $N_1$, is proportional to (i) a difference between the ith speech input signal line spectral pair frequencies and the ith reference speech signal line spectral pair frequencies and (ii) a shift of the difference by an ith frequency shifting factor to at least partially compensate for frequency shifting of the ith speech input signal line spectral pair frequency by acoustic noise, wherein $N_1$ is greater than or equal to one and less than or equal to P.

In one embodiment of the present invention, a method of robust speech recognition in an automotive environment includes the steps of receiving a speech input signal, representing the speech input signal with a vector $f$ of P line spectral pair frequencies, and representing a codeword in a quantizer codebook as a vector $\hat{f}$ of P line spectral pair frequencies. The method further includes the step of determining a distance measure between the vector $f$ and the vector $\hat{f}$, wherein the distance measure, $d(f,\hat{f})$, is defined by:

$$d(f,\hat{f}) = \sum_{i=1}^{N_1} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein the constants $\alpha_1$, $\alpha_2$, $\beta_1$ and $\beta_2$ are set to substantially minimize quantization error, and $e_i$ is the error power spectrum of the speech input signal and a predicted speech input signal at the ith line spectral pair frequency of the speech input signal.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

This description uses the following abbreviations:
FMQ—Fuzzy Matrix Quantization
FVQ—Fuzzy Vector Quantization
MQ—Matrix Quantization
HMM—Hidden Markov Model
λ—a HMM process
Pr(O|λ)—Probability of model/process λ producing observation O
NN—Neural network
MLP—Multilevel Perceptron neural network
LSP—Line Spectral Pair dB—decibel
FD—fuzzy distance measure
IWSR—Isolated Word Speech Recognition
SNR—Signal to Noise Ratio Referring to an embodiment of a speech recognition system in FIG. 3, IWSR speech recognition system 300 combines the classification power of speech classifier neural network 302 with temporal distortion and probability information derived from frames of input speech signal 304 with at least one speech preprocessor to classify speech signal 304 from a predetermined set of vocabulary words. In preparation for IWSR, speech recognition system 300 undergoes a training process of designing FMQ 307 codebooks and preclassifier robust FMQ 308 codebook and training u hidden Markov models in preclassifier HMMs 306 and neural network 302. A data base of u words repeated r times and corrupted by s different levels of acoustic noise is used during the training process, where u corresponds to the vocabulary of speech recognition system 300, and s and r are positive integers, for example, seven and thirty, respectively.

Figure 3:
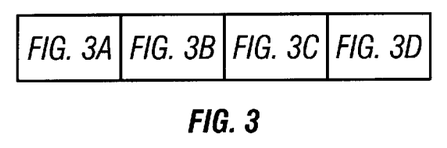
FIG. 3 illustrates an FMQ/HMM/MLP speech recognition system.
Figure 3A:
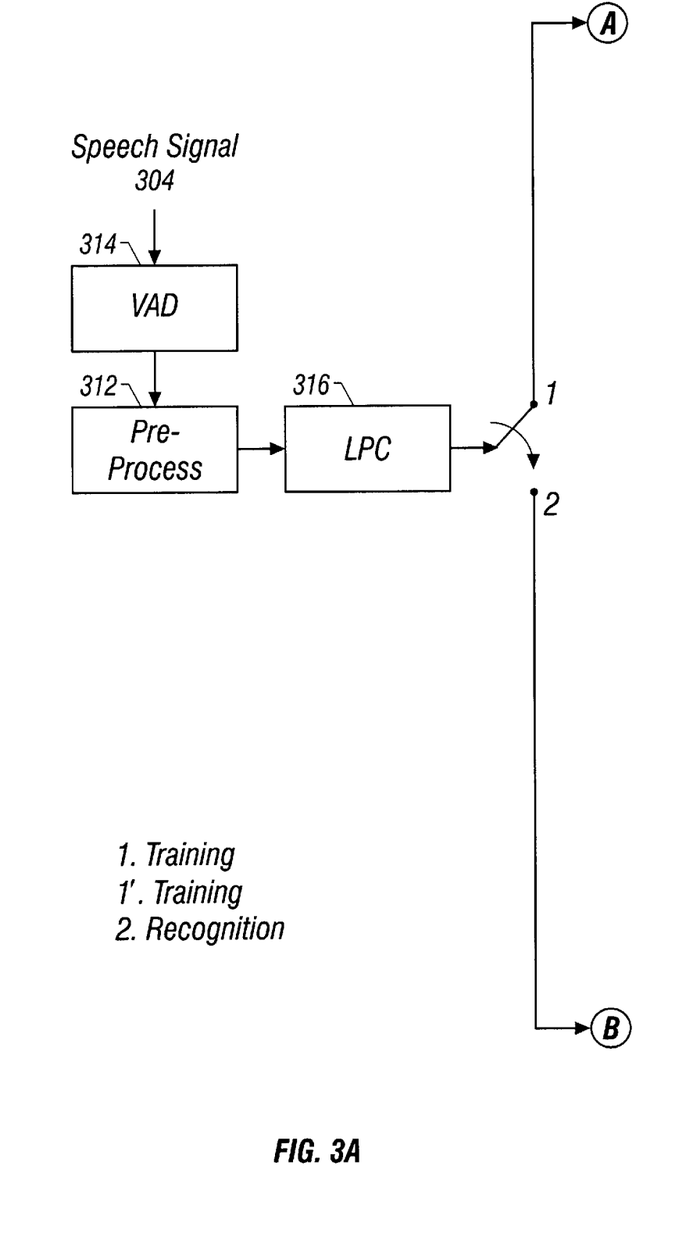
Figure 3B:
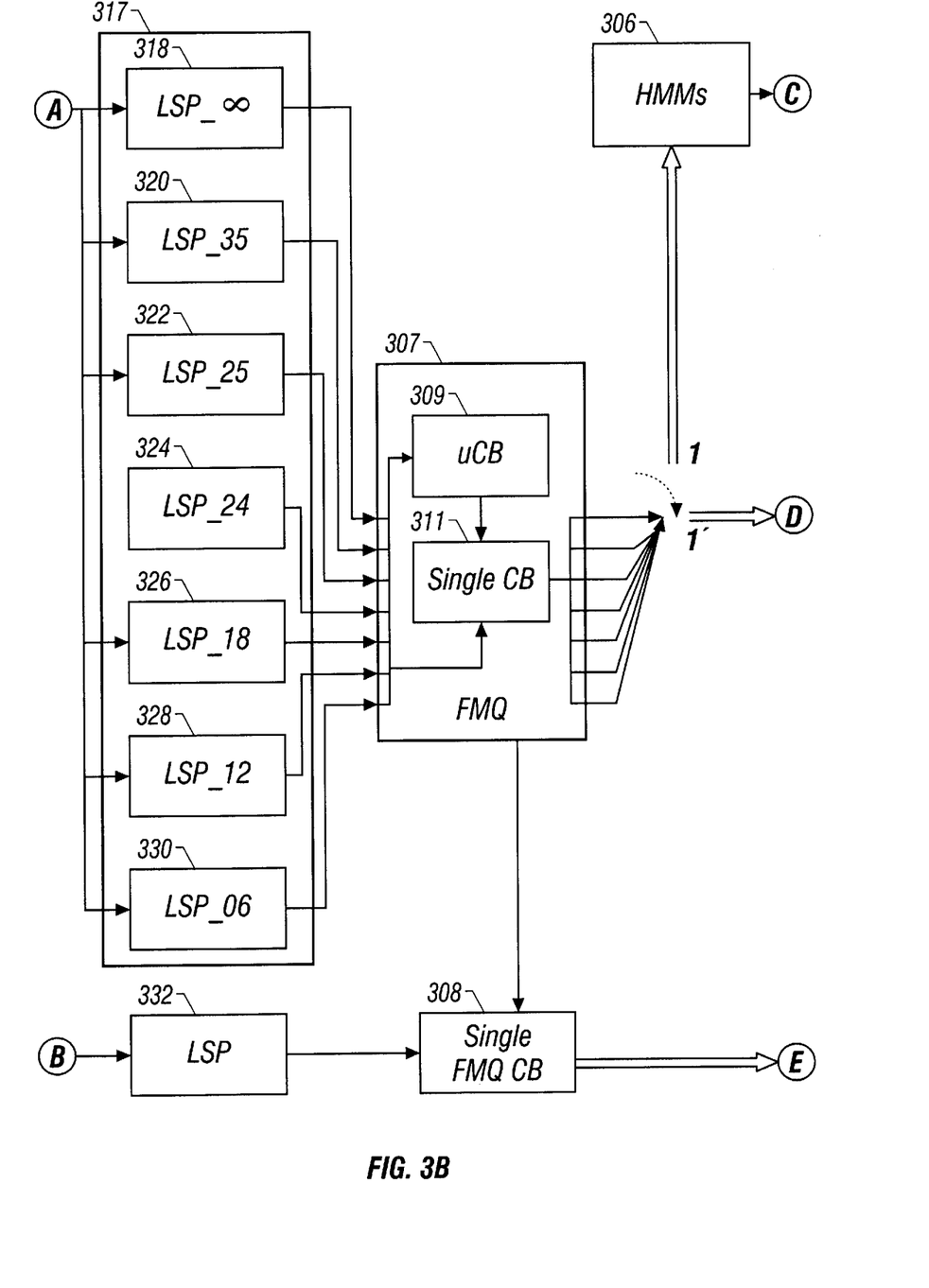
Figure 3C:
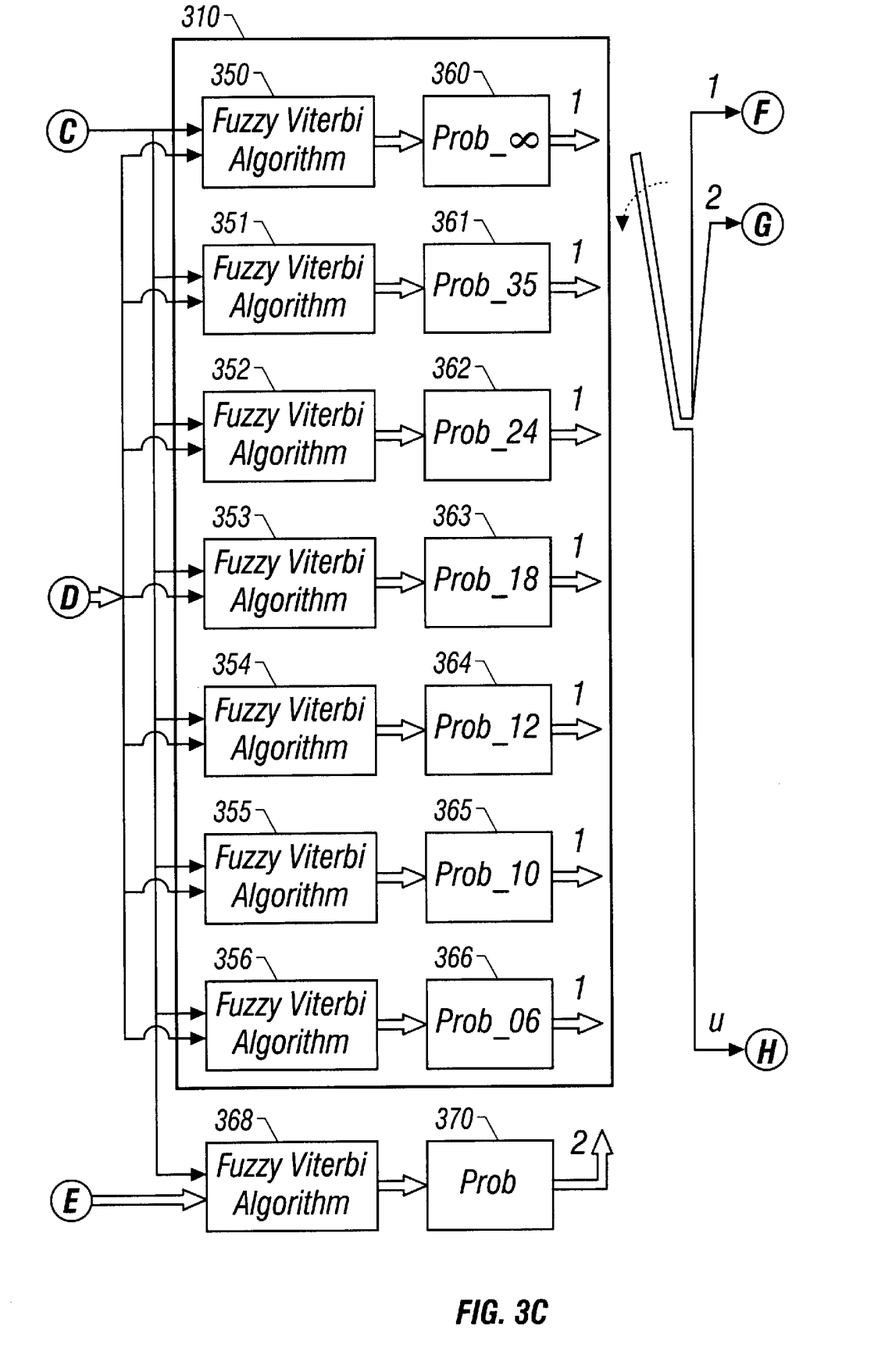
Figure 3D:
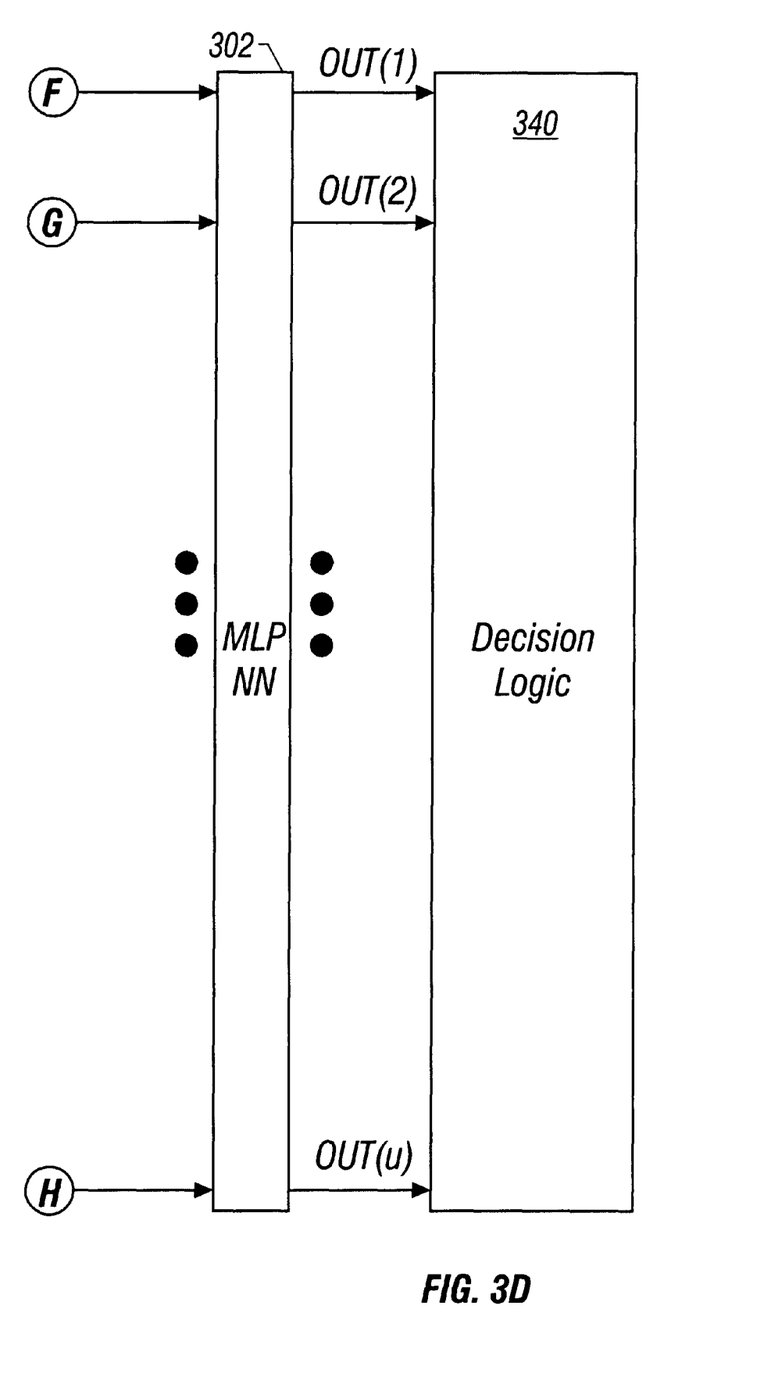

During quantization, a distance measure between input signal and codeword spectral frequencies is used to compensate for noise corruption. More specifically, compensation error factors may be computed using an error power spectrum of a speech input signal and a predicted speech input signal. The noise to be compensated for may be known, for example, from knowledge of a specific operating environment or may be dynamically determined. The error factors are used to appropriately shift and weight each of the ith frequencies of input signal and codeword frequencies to compensate for noise corruption.

FMQ 308, with a single codebook for u words, is a front end to HMMs 306, and speech recognition system 300 uses an observation sequence $O_n$ of probability mass vectors from FMQ 308 to respectively train the HMMs 306. Signal modeling based on HMMs 306 can be considered as a technique that extends conventional stationary spectral analysis principles to the analysis of the quantized time-varying speech input signal 304. The time-varying quantized properties of speech input signal 304 are used by processes $\lambda_n$ of HMMs 306 and Viterbi algorithm 310 to describe speech signal 304 probabilistically. Maximum likelihood probabilities $Pr(O_n|\lambda_n)$ 360–366 calculated at seven respective SNR levels with a Viterbi algorithm serve respectively as input data to respective nodes of MLP neural network 302.

Speech recognition system 300 is designed to classify an input speech signal 304 word as one of u predetermined vocabulary words. Initially during training, for each of u vocabulary words, u codebooks 309 in FMQ 307 are respectively designed using the nth word of u vocabulary words repeated r times at s SNR levels. Thus, a total training database has u times r times s (urs) entries. Each of the usr words in the database is input to speech recognition system 300 as speech input signal 304 and preprocessed by preprocess operation 312 which, for example, band limits speech signal 304 to 3.6 kHz and samples speech signal 304 at 8 ksamples/sec with a resolution of 16 bits per sample. During speech recognition, when continuous speech is produced, voice activity detector (VAD) 314 effectively defines end points of input words for IWSR. A P order linear predictive code (LPC) analysis is performed in LPC operation 316 on a 20 msec frame of speech signal 304 with a 10 msec overlap between frames to compute the LPC coefficients for the speech signal 304 frame using, for example, the Burg algorithm. P may vary depending on trade offs between desired resolution and processing speed and in this embodiment, P is assumed to be in the range of ten to sixteen. Frame times may vary and are, in general, chosen to represent an approximately static vocal tract period in a range of, for example, 10–30 msec. The training process follows the path through path position 1-1', to LSP operation 317 where line spectral pair frequencies are derived in a well-known manner from the respective LPC coefficients. LSP_(SNR) operations 318, 320, 322, 324, 326, 328, and 330 indicate that line spectral pair frequencies (coefficients) are generated by LSP operation 317 for each speech signal 304 frame for all seven SNR levels from the LPC coefficients.

In the embodiment of FIG. 3, the respective SNR levels used to train speech recognition system 300 are clean speech (∞), 35 dB, 25 dB, 24 dB, 18 dB, 12 dB, and 6 dB to model various noises in an automotive environment. Other SNR values may be chosen to model other speech environments or more extensively model the automotive environment. Speech recognition system 300 is designed for robustness by training with multiple acoustic noise SNR corruption levels to better model realistic speech signal 304 input conditions where speech is corrupted by acoustic noise.

The LSP representations of speech signal 304 are used to define a spectral envelope because they provide a robust representation of the speech short-term magnitude spectral envelope of speech signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of speech signal 304 and the corresponding all-pole filter $H(z)=G/A(z)$, where $A(z)$ is the inverse filter given by $$A(z)=1+a_1 z^{-1}+a_2 z^{-2}+\ldots+a_P z^{-P}$$

where P is the order of the predictor and $\{a_i\}$ are the prediction coefficients, the LSPs are defined by decomposing the inverse filter polynomial into two polynomials, $$P(z)=A(z)+z^{-(P+1)}A(z-1),$$

and $$Q(z)=A(z)-z^{-(P+1)}A(z-1),$$

where P(z) is a symmetric polynomial, Q(z) is an antisymmetric polynomial and $$A(z)=\tfrac{1}{2}[P(z)+Q(z)].$$

The roots of the polynomials P(z) and Q(z) define the LSP frequencies (coefficients).

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 300–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters. Therefore, a robust LSP distance measure $d(f,\hat{f})$, computed by FMQ 307 and FMQ 308, between an LSP vector $f$, formed from LSP coefficients in operations LSP_(SNR) operations 318–332 from an input word, and a reference vector $\hat{f}$ which is a matrix centroid in FMQ 307 and FMQ 308 is given by:

$$d(f, \hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

where $f$ and $\hat{f}_i$ are the ith LSP in the test and reference vector, respectively. The constants $\alpha_1$, $\alpha_2$, $\beta_1$ and $\beta_2$ are experimentally determined to minimize quantization error. For the automotive noise environment studied, $\alpha_1$ is set to 1.6, $\alpha_2$ is set to 0.68, $\beta_1$ is set to 0.5, and $\beta_2$ is set to 0.25. When noise amplitude is large, the quantization error will also be large. Thus, when speech is corrupted by car noise, the frequency shift can compensate the car noise affect at low LSP frequencies and the weight can compensate at high LSP frequencies to reduce quantization error. Reducing quantization error improves the recognition accuracy of speech recognition system 300.

The error $e_i$ is the weight and frequency shift for the ith LSP and is given by the LPC error power spectrum at the different test LSP frequencies. Speech signal 304 is sampled at a rate of n samples per second, and one frame of speech signal 304 is represented by speech input signal s(n) and an error, e(n), between the speech input signal s(n) and a predicted speech input signal, ŝ(n), is $$e(n) = s(n) - \hat{s}(n) = s(n) - \sum_{k=i}^{P} \alpha_k s(n-k)$$

where $\alpha_k$ are prediction coefficients and are selected to minimize the total squared prediction error defined by the energy of e(n):

$$E_n = \sum_m e^2(m) = \sum_m [s_n(m) - \hat{s}_n(m)]^2$$

and can be found by setting $\partial E_n / \partial \alpha_1 = 0$, for i=1, 2, . . . , P.

A discrete Fourier transform of e(n) yields: $|E(e^{j2\pi f i})|^2$, i=1, 2, . . . , P which is the spectrum associated with the speech input signal represented by P order LSPs as a function of LSP frequencies. Thus, the error $e_i$ is defined as:

$e_i = |E(e^{j2\pi f i})|^2$, where $f_i$ is the ith LSP frequency of the speech input signal.

The frequencies that are shifted are the frequencies at which noise energy is primarily concentrated. Noise energy concentrations may be dynamically detected using a noise detector (not shown) or may be predetermined based on knowledge of a known user environment. Additionally, in some operating environments, such as in a car, noise changes according to traveling speed. The speed can be detected and a database of predicted noise energy frequency concentration may be accessed by a processor (not shown) to dynamically adjust the error compensation of the robust distance measure.

Each of the u codebooks 309 for a given vocabulary word is designed by developing a matrix entry from each corresponding input word $W_{nkm}$, n=1, 2, . . . u, k=1, 2, . . . , s, m=1, 2, . . . , r, from the database of usr words. The sr matrix entries for each of the u words at each of the s SNR levels are processed to optimally cluster each of the sr entries for each of the u codebooks 309 into C cells. A centroid is computed for each of the C cells for each of the u codebooks 309 for minimum quantization distortion using, for example, a Fuzzy C-algorithm or a fuzzy Linde-Buzo-Gray (LBG) algorithm as illustratively discussed in chapter 3, section 3.3.4 of the Doctor of Philosophy thesis of Lin Cong entitled "A Study of Robust IWSR Systems" and located in the John Rylands University Library of Manchester in Manchester, England, which thesis is hereby incorporated by reference in its entirety, and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Thus, u matrix codebooks (MCBn) 309 in FMQ 307 are formed.

Each of the u codebooks 309 is used to design a single codebook 311 by combining the C centroids of each of the u codebooks 309 into u times C centroids of the single codebook 311. The individual centroids are preferably unaltered after combining. Cu may be chosen to accommodate available speech recognition system 300 resources and is, for example, equal to the training vocabulary word size times 16.

FMQ 307 utilizes interframe information related to the "evolution" of the speech short-term spectral envelopes of speech signal 304 by operating on N consecutive speech frames of speech signal 304. Each frame is represented by P LSP coefficients, and, thus, an N frames speech input signal segment provides a P×N matrix of LSP coefficients. Each matrix entry for a speech signal 304 input word $W_{nkm}$ may be designed using a training set of TO speech spectral vectors for each of TO frames of each speech signal 304 word $W_{nkm}$, which result in a set $X = \{x_1, x_2, \ldots, x_T\}$ of T, P×N matrices for each speech signal 304 word $W_{nkm}$, where T=int(TO/N)

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \end{bmatrix} = [\bar{x}_k(1), \bar{x}_k(2), \ldots, \bar{x}_k(N)],$$

where the $\bar{x}k(j) = [x_{1j}^k x_{2j}^k \ldots x_{Pj}^k]'$, j=1, 2, . . . ,N, k=1, 2, . . . , T for each word $W_{nkm}$ is grouped by word to form the rs entries in the corresponding nth FMQ 309 codebook. The $\bar{x}k(j)$ for each word entry in a codebook is processed using, for example, the LBG algorithm, to yield a C-cell partitioning of the matrix space for each codebook and V-matrix entries containing C $v_i$, i=1, 2, . . . , C, P×N, codeword matrices $$v_i = \begin{bmatrix} v_{11}^i & v_{12}^i & \cdots & v_{1N}^k \\ v_{21}^i & v_{22}^i & \cdots & v_{2N}^k \\ \cdots & \cdots & \cdots & \cdots \\ v_{P1}^i & v_{P2}^i & \cdots & v_{PN}^i \end{bmatrix} = [\overline{v}_i(1), \overline{v}_i(2), \ldots, \overline{v}_i(N)],$$

where $\overline{v}i(j) = [v_{1j}^i \; v_{2j}^i \; \ldots \; v_{Pj}^i]'$, $j = 1, 2, \ldots, N$.

Each of the C codeword matrices $v_i$ for each of the u codebooks 309 are combined as described above to form the single codebook 311 having C time u codeword matrices $v_i$, $i = 1, 2, \ldots$, Cu, C codewords per vocabulary word.

Continuing the training process of speech recognition system 300, each of the training word $W_{nkm}$ entries in the urs training word database are provided as a respective training speech signal 304 to the single codebook 311. Each training speech signal 304 is preprocessed by preprocess operation 312, and LPC coefficients are determined in LPC operation 316 as described above. Each of the LPC coefficients are converted into respective line spectral pair frequencies by LSP operation 317. Each of the training words $W_{nkm}$ is represented by a respective set of the TO speech spectral vectors for each frame of each speech signal 304 word $W_{nkm}$, which result in a set $X = \{x_1, x_2, \ldots, x_T\}$ of T, P×N matrices for each speech signal 304 word $W_{nkm}$, where $T = \text{int}(TO/N)$.

A non-fuzzy matrix quantization of X can be described by a Cu×T classification matrix U of elements:

$$u_{ik} = \begin{cases} 0, & x_k \notin A_i \quad i = 1, 2, \ldots, Cu \\ 1, & x_k \in A_i \quad k = 1, 2, \ldots, T. \end{cases}$$

Furthermore, the elements of this single codebook MQ matrix satisfy the following two conditions:

a) $\sum_{i=1}^{Cu} u_{ik} > 1;$ i.e., only one element in a column is equal to one; the remaining elements are zero. This implies that each matrix $x_k$ is "quantized" to only one centroid of the matrix space.

b) $\sum_{k=1}^{T} u_{ij} > 0;$ this ensures that there is no empty cell in this Cu-class partitioning of the matrix space.

The columns $O_j$, $j = 1, 2, \ldots, T$, of the classification matrix U "map" effectively an input matrix $x_j$ into a vector $O_j = \{u_{1j}, u_{2j}, \ldots, u_{Cuj}\}$ with all zero values except one element $u_{ij} = 1$ indicating that the distance $$J(O_j, V) = \sum_{i=1}^{Cu} u_{ij} d(x_j, v_i)$$

between $x_j$ and the ith cell is minimized. Note that each of the columns of relative closeness indices Oj, $j = 1, 2, \ldots, T$ represents the input signal 304 at different instances in time. $d(x_j, v_j)$ is the distance measure $$d(x_j, v_i) = \frac{1}{P} \sum_{m=1}^{P} d(\overline{x}_j(n), \overline{v}_i(n))$$

and, for example, the distance measure $$d(\overline{x}_j(n), \overline{v}_i(n)) \sum_{m=1}^{P} (x_{mn}^j - v_{mn}^i)^2.$$

This distance measure is the distance between the jth column vector $x_j$ and $v_i$, which is the centroid of the ith cell. Note that for a non-fuzzy MQ codebook, an optimum partition of the matrix space of each of the u codebooks 309 into the C cells before combining the u codebooks 309 into single codebook 311 ensures that $$J(U, V) = \sum_{j=1}^{T} \sum_{i=1}^{Cu} u_{ij} d(x_j, v_i)$$

is minimized. Different distance measures utilize different quantization mechanisms for computing the "centroid" matrices $v_i$. Using the robust distance measure with $e_i$ shifting and weighting increases quantization accuracy.

The fuzzy matrix quantization of each of the training words $W_{nkm}$ X, using the single codebook 311, is described by a Cu×T fuzzy classification matrix $U_F$ with elements $u_{ik} \in [0,1]$, $i = 1, 2, \ldots$, Cu, $k = 1, 2, \ldots, T$. The value of $u_{ik}$, $0 \leq u_{ik} \leq 1$, indicates the degree of fuzziness of the kth input matrix $x_k$ to the ith partitioning cell which is represented by the centroid $v_i$. The two conditions are also satisfied:

$$\sum_{i=1}^{Cu} u_{ik} = 1 \quad \text{and} \quad \sum_{k=1}^{T} u_{ik} > 0$$

In this case, $u_{ik}$ is derived as:

$$u_{ik} = \frac{1}{\sum_{j=1}^{Cu} \left( \frac{d_{ik}(x_k, v_i)}{d_{jk}(x_k, v_j)} \right)^{\frac{1}{(F-1)}}}.$$

where the constant F influences the degree of fuzziness. $d_{ik}(x_k, v_j)$ are the average distance measures as defined with reference to the MQ design.

The columns of probability mass vectors $O_j$ of the classification matrix $U_F$ "map" an input matrix $x_j$ into a probability mass vector of indices $O_j = \{u_{1j}, u_{2j}, \ldots, u_{Cuj}\}$ which results in the distance $$J(O_j, V) = \sum_{i=1}^{Cu} u_{ij}^F d(x_j, v_i).$$

When using the robust distance measure, $d(x_j, v_i)$ equals $$d(f, \hat{f}) = \sum_{i=1}^{N_1} \alpha_1 \left[ (f_i - e_i^{\beta 1} - \hat{f}_i) \right]^2 + \sum_{i=N_1+1}^{P} \alpha_2 \left[ (f_i - \hat{f}_i) e_i^{\beta 2} \right]^2$$

Furthermore, the overall distance of the Cu entries of FMQ 308 operating on the X matrix set or a speech signal 304 word $W_{nkm}$ is $$J(U, V)=$$

$$J(U, V) = \sum_{j=1}^{T}\sum_{i=1}^{Cu} u_{ij}^F d(x_j, v_i).$$

$d(x_j, v_i).$

Note that the summation of $O_j$ entries is equal to unity. The largest component of $O_j$ is the one which corresponds to the codeword with the smallest $d(x_j, v_i)$ value. $O_j$ can be interpreted as a probability mass vector relating the input matrix $x_j$ to all $v_i$, i=1, 2, . . . , Cu. The total observation sequence $O_n$ of probability mass vectors for each speech signal 304 word for one codebook is defined as $O_n=\{O_1, O_2, \ldots, O_T\}$, $O_j=\{u_{1j}, u_{2j}, \ldots, u_{Cuj}\}$.

Equations J(U, V)=

$$J(U, V) = \sum_{j=1}^{T}\sum_{i=1}^{Cu} u_{ij} d(x_j, v_i) \text{ and } J(U, V) = \sum_{j=1}^{T}\sum_{i=1}^{Cu} u_{ij}^F d(x_j, v_i)$$

respectively provide the MQ and FMQ distance and can also be represented by the general distance equation:

$FD=J(W, V)=$ $$FD = J(W, V) = \sum_{j=1}^{T}\sum_{i=1}^{Cu} w_{ij} d(x_j, v_i),$$

$w_{ij}d(x_j, v_i),$ where $$w_{ij} = \begin{cases} u_{ij} & u_{ij} \in \{0, 1\} \\ u_{ij}^F & u_{ij} \in [0, 1] \end{cases}$$

Fuzzy matrix quantization is further illustratively discussed in Xydeas and Cong, "Robust Speech Recognition in a Car Environrment," International Conf. on Digital Signal Processing, Vol. 1, pp. 84–89, June, 1995, Cyprus, which is herein incorporated by reference in its entirety.

Figure 4:
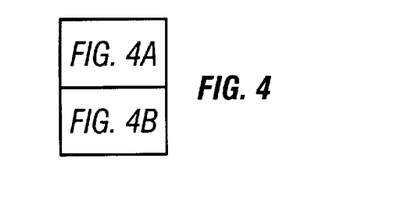
FIG. 4 illustrates one embodiment of determining a distance measure in a quantizer between an ith line spectral pair frequency and an ith line spectral frequency of a reference speech signal.
Figure 4A:
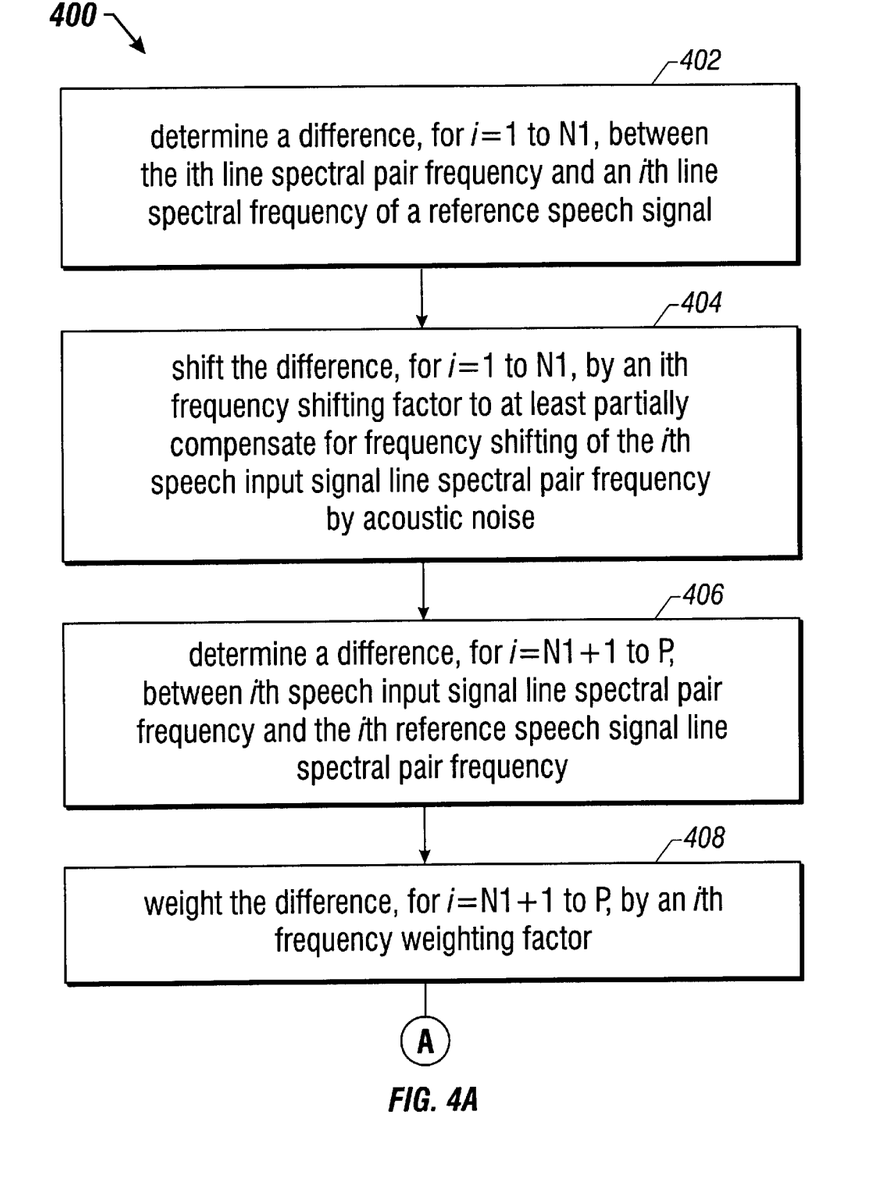
Figure 4B:
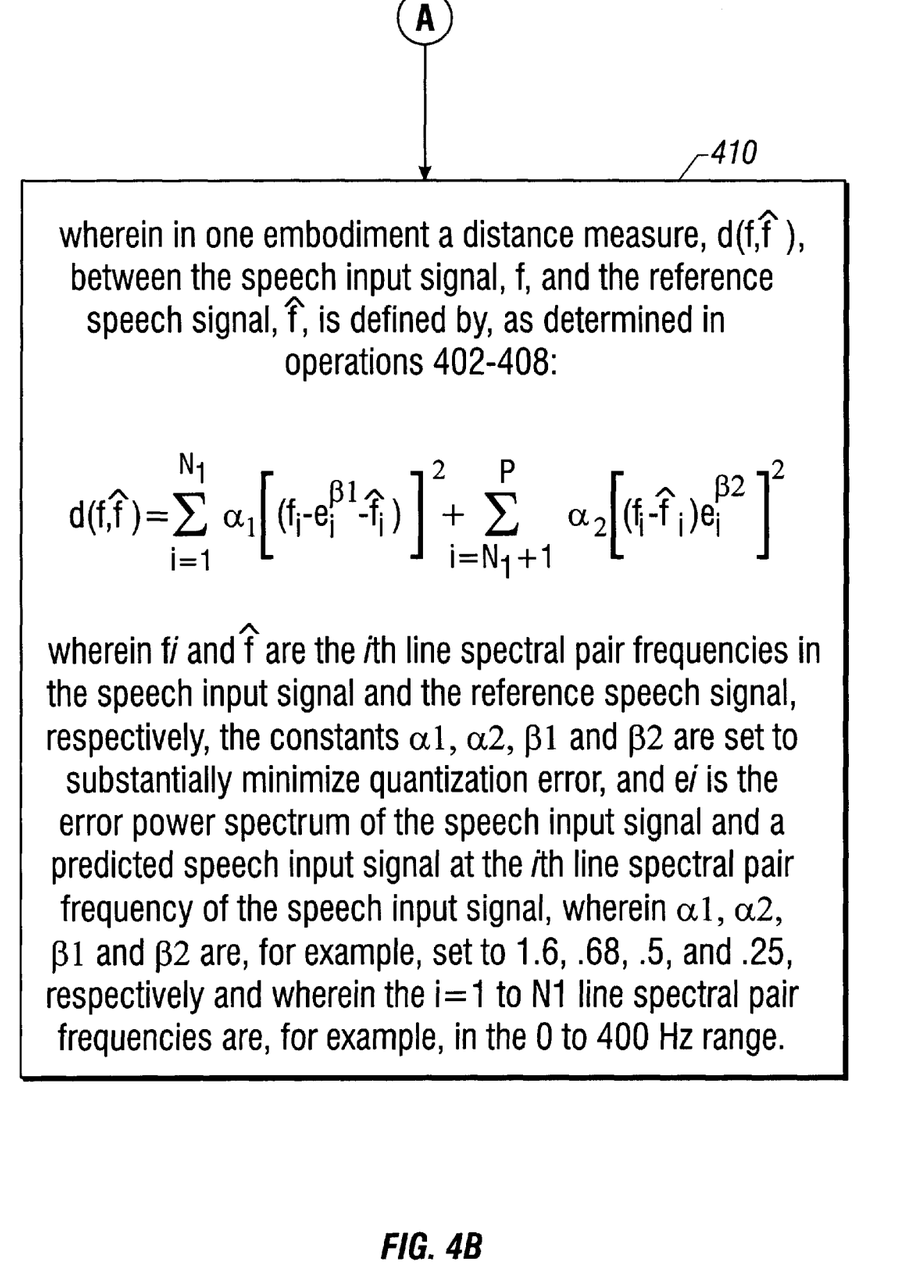

FIG. 4 illustrates one embodiment of a robust distance measure determining operation 400 using a quantizer such as FMQ 307. Referring to FIGS. 3 and 4, in operation 317 line spectral pair frequencies are derived in a well-known manner as described above. To determine a distance measure, the quantizer, such as FMQ 307, in operation 402 determines a difference, for i=1 to N1 , between the ith line spectral pair frequency and an ith line spectral frequency of a reference speech signal. The quantizer in operation 404 shifts the difference by an ith frequency shifting factor to at least partially compensate for frequency shifting of the ith speech input signal line spectral pair frequency by acoustic noise. In a further embodiment, the quantizer also determines a difference, for i=N1+1 to P, between ith speech input signal line spectral pair frequency and the ith reference speech signal line spectral pair frequency and, in operation 408, weights the difference by an ith frequency weighting factor. Referring to block 410, in one embodiment a distance measure, $d(f,\hat{f})$, between the speech input signal, f, and the reference speech signal, $\hat{f}$, is defined by, as determined in operations 402–408:

$$d(f, \hat{f}) = \sum_{i=1}^{N_1} \alpha_1[(f_i - e_i^{\beta_1} - \hat{f}_i)]^2 + \sum_{i=N_1+1}^{P} \alpha_2[(f_i - \hat{f}_i)e_i^{\beta_2}]^2$$

wherein $f_1$ and $\hat{f}$ are the ith line spectral pair frequencies in the speech input signal and the reference speech signal, respectively, the constants $\alpha 1$, $\alpha 2$, $\beta 1$ and $\beta 2$ are set to substantially minimize quantization error, and ei is the error power spectrum of the speech input signal and a predicted speech input signal at the ith line spectral pair frequency of the speech input signal, wherein $\alpha 1$, $\alpha 2$, $\beta 1$ and $\beta 2$ are, for example, set to 1.6, 0.68, 0.5, and 0.25, respectively and wherein the i=1 to N1 line spectral pair frequencies are, for example, in the 0 to 400 Hz range.

During the training mode of speech recognition system 300, the training input data for the hidden Markov models of classifier HMMs 306 are in one embodiment the observation sequences $O_n$ of probability mass vectors $O_j$ from a classification matrix U. The classification matrix U is generated by FMQ 308 from a fuzzy matrix quantized speech input signal for each of the training words $W_{nkm}$ as described above. HMMs 306 have a respective process $\lambda_n$, n=1, 2, . . . , u, for each of the u words. Each of the respective u vocabulary words for each repetition r and SNR levels s is, in one embodiment, fuzzy matrix quantized to train a corresponding HMM process $\lambda_n$. Each of the observation sequences $O_n$ from FMQ 308 for each of the urs training words train corresponding HMM processes, $\lambda_n$, n=1, 2, . . . , u, i.e. for an nth vocabulary word, an input observation sequence $O_n$ trains only the nth HMM $\lambda_n$. Fuzzy Viterbi algorithm operation 310, described in section 4.3 of L. Cong, "A Study of Robust IWSR Systems" utilizes a respective observation sequence $O_n$ from each of the rs versions of each of the u words and a fuzzy Viterbi algorithm to produce a maximum likelihood probability $Pr(O_n|\lambda_n)$ of the HMM process $\lambda_n$ producing the observation sequence $O_n$. Separate HMMs may be built for males and females, and the number of states of each HMM is set to, for example, five. HMM training is further described in chapter 2 and chapter 4, section 4.3 of L. Cong, "A Study of Robust IWSR Systems".

In one embodiment neural network 302 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 302 has an ability to partition an input pattern space in a classification problem and to represent relationships between events. Additionally, MLP neural network 302 with multiple layers and sufficient interconnections between nodes ensures an ability to "learn" complex classification boundaries, and implement nonlinear transformations for functional approximation problems. The MLP has G hidden nodes where G is preferably determined empirically based upon the number of u vocabulary words, memory size, and processing capabilities.

The MLP neural network 302 is trained using the maximum likelihood probabilities produced by fuzzy Viterbi algorithm operation 310. The post-classifier MLP neural network 302 accepts the input data and is appropriately designed using the well-known back propagation algorithm. The MLP neural network 302 is trained for the nth vocabulary word, using the back propagation algorithm, with the s SNR values of each of the r single word versions. Multiple fuzzy Viterbi algorithms 350–356 with corresponding maximum likelihood probabilities 36–366 are shown to indicated that MLP neural network 302 is trained using words corrupted by acoustic noise of SNR levels ∞dB, 35 dB, 24 dB, 18 dB, 12 dB, 10 dB, and 06 dB.

After training the speech recognition system 300, path 2 is selected to initiate a speech signal 304 recognition process. When any speech signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames, each frame t seconds, such as 20 msec with a 10 msec overlap of each consecutive frame, of $W_n$. LPC operation 316 generates P LPC coefficients for each frame of the $W_n$, and LSP operation 332 generates Pth order LSP coefficients from the LPC coefficients as described above.

FMQ 308 utilizes interframe information related to the "evolution" of the speech short-term spectral envelopes of speech signal 304 word $W_n$ by operating on N consecutive speech frames of word $W_n$. Since each frame is represented by the P order LSP coefficients, and N frames of speech input signal segment of word $W_n$ provide. Each of T of speech signal 304 word $W_n$ is represented by a P×N matrix of LSP coefficients, where T=int(TO/N). Word $W_n$ may, thus, be represented as a matrix $X_{Wn}=\{x_1, x_2, \ldots, x_T\}$ of T, P×N matrices for each speech signal 304 word $W_{nkm}$, where each of the T, P×N matrices is defined as:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \end{bmatrix} = [\bar{x}_k(1), \bar{x}_k(2), \ldots, \bar{x}_k(N)],$$

where $\bar{x}k(j)=[x_{1j}^k x_{2j}^k \ldots x_{Pj}^k]$, j=1, 2, ..., N, k=1, 2, ..., T.

FMQ 308 fuzzy matrix quantizes the matrix representation $X_{Wn}=\bar{x}k(j)$ of word $W_n$ with the designed Cu codeword entries of the single codebook 311. Single codebook FMQ 308 produces the fuzzy distance measure FD and yields an observation sequence $O_n$ of T probability mass vectors $O_j$, j=1, 2, ..., Cu. Observation sequence $O_n$ is used as input data by a fuzzy Viterbi algorithm 368 operating on each of the HMM $\lambda_n$ processes of HMMs 306. The u outputs of the fuzzy Viterbi algorithm 310 are the respective maximum likelihood probability Pr' $(O_n|\lambda_n)$ measures that each of the $\lambda_n$ processes corresponds to $W_n$.

These u respective maximum likelihood probability Pr' $(O_n|\lambda_n)$ measures are the input data for u input nodes of MLP neural network 302. The MLP neural network 302 has u outputs {OUT(1), OUT(2), ..., OUT(u)} from u output nodes which assume classification values in the region 0<OUT(j)<1. Decision logic 340 classifies $W_n$ as the nth vocabulary word if OUT(i)=max{OUT(1), OUT(2), ..., OUT(u)}. The fuzzy distance measure FD is generated as described above using the robust distance measure. Accordingly, because the robust distance measure compensates for, for example, noise, speech recognition system 300 recognition accuracy is improved.

While the invention has been described with respect to the embodiments and variations set forth above, these embodiments and variations are illustrative and the invention is not to be considered limited in scope to these embodiments and variations. For example, the embodiment of speech recognition system 300 can be further simplified to a robust HMM based IWSR structure by removing the MLP post-classifier from the system FMQ/HMM/MLP shown in FIG. 3 to form a FMQ/HMM speech recognition system 300. Furthermore, other speech recognition systems may utilize the robust frequency shifting and weighting distance measure such as the speech recognition systems described in concurrently filed, U.S. Patent Application by Safdar M. Asghar and Lin Cong, U.S. Patent and Trademark Office Ser. No. 08/883, 978 and filing date of Jun. 27, 1997 and entitled "Noise Adaptive Speech Recognition With Selective Input Data To A Neural Network", which is hereby incorporated by reference in its entirety. Additionally, systems having, for example, a quantizer, such as a vector quantizer (VQ), fuzzy VQ, MQ, and/or FMQ, alone or as a front end to one or more speech classifiers such as hidden Markov models and/or a neural network, such as multilevel perceptron neural network, may utilize the robust line spectral pair distance measure to classify speech input signals. Accordingly, various other embodiments and modifications and improvements not described herein may be within the spirit and scope of the present invention, as defined by the following claims.

What is claimed is:

1. A speech recognition system comprising:
  a line spectral pair generator to generate line spectral pair frequencies from a speech input signal; and
  a first speech classifier comprising:
    a quantizer for determining a distance measure between an ith speech input signal line spectral pair frequency and an ith reference speech signal line spectral pair frequency, wherein the distance measure, for i=1 to $N_1$, is proportional to (i) a difference between the ith speech input signal line spectral pair frequency and the ith reference speech signal line spectral pair frequency and (ii) a shift of the difference by an ith frequency shifting factor to at least partially compensate for frequency shifting of the ith speech input signal line spectral pair frequency by acoustic noise, wherein $N_1$ is greater than or equal to one and less than or equal to P;
  wherein the first speech classifier is capable of receiving output data based on the distance measures and is capable of generating speech classification output data for classifying the speech input signal.

2. The speech recognition system of claim 1 wherein the quantizer is for further determining a distance measure between ith speech input signal line spectral pair frequency and the ith reference speech signal line spectral pair frequency, wherein the distance measure, for i=$N_1$+1 to P, is derived from (i) a difference between the ith speech input signal line spectral pair frequency and the ith reference speech signal line spectral pair frequency and (ii) a weighting of the difference by an ith frequency weighting factor.

3. The speech recognition system of claim 2 wherein the distance measure, $d(f,\hat{f})$, between the speech input signal, $f$, and the reference speech signal, $\hat{f}$, is defined by:

$$d(f,\hat{f}) = \sum_{i=1}^{N_1} \alpha_1\left[(f_i - e_i^{\beta1} - \hat{f}_i)\right]^2 + \sum_{i=N_1+1}^{P} \alpha_2\left[(f_i - \hat{f}_i)e_i^{\beta2}\right]^2$$

wherein $f_i$ and $\hat{f}_i$ are the ith line spectral pair frequencies in the speech input signal and the reference speech signal, respectively, the constants $\alpha_1$, $\alpha_2$, $\beta_1$ and $\beta_2$ are set to substantially minimize quantzation error, and $e_i$ is the error power spectrum of the speech input signal and a predicted speech input signal at the ith line spectral pair frequency of the speech input signal.

4. The speech recognition system of claim 3 wherein the $i=1$ to $N_1$ line spectral pair frequencies are in the 0 to 400 Hz range.

5. The speech recognition system of claim 3 wherein $\alpha_1$ is set to 1.6, $\alpha_2$ is set to 0.68, $\beta_1$ is set to 0.5, and $\beta_2$ is set to 0.25.

6. The speech recognition system of claim 1 wherein the ith frequency shifting factor is proportional to a power spectrum of a linear prediction error at the ith line spectral pair frequency.

7. The speech recognition system of claim 1 further comprising:
a quantizer having a codebook having C codewords for generating the distance measure between each of the P line spectral pair frequencies of the speech input signal and each of a plurality of reference speech signals; and
a second speech classifier to receive the output data based on the distance measures and generate speech classification output data to classify the speech input signal as one of u vocabulary words.

8. The speech recognition system of claim 7 wherein the quantizer is a single codebook quantizer having codewords representing a vocabulary of u words.

9. The speech recognition system of claim 7 further comprising:
a third speech classifier to receive output data from the first speech classifier and classify the speech input signal as one of the u vocabulary words.

10. The speech recognition system of claim 7 wherein the second speech classifier is a neural network.

11. The speech recognition system of claim 7 wherein the quantizer is a fuzzy matrix quantizer further for generating respective fuzzy distance measures between the respective speech input signal and reference speech signal P line spectral pair frequencies using the corresponding generated distance measures; and
wherein the second speech classifier is a neural network and the output data is a fuzzy distance measure proportional to a combination of the generated fuzzy distance measures.

12. The speech recognition system of claim 11 wherein the quantizer is a fuzzy matrix quantizer further for generating an observation sequence of indices indicating the relative closeness between the respective speech input signal and reference speech signal P line spectral pair frequencies; and
wherein the second speech classifier includes u hidden Markov models and a fuzzy Viterbi algorithm module for determining a respective probability for each of the u hidden Markov models that the respective hidden Markov model produced the observation sequence.

13. The speech recognition system of claim 1 wherein the speech input signal is represented by P line spectral pair frequencies, where P is a non-negative integer, and the reference speech signal is represented by P line spectral pair frequencies.

14. A speech recognition system comprising:
means for generating P order line spectral pair frequencies for a speech input signal;
means for determining a difference, for $i=1$ to $N_1$, between the ith line spectral pair frequency and an ith line spectral frequency of a reference speech signal;
means for shifting the difference by an ith frequency shifting factor, for $i=1$ to $N_1$, to at least partially compensate for frequency shifting of the ith speech input signal line spectral pair frequency by acoustic noise;
means for determining a difference, for $i=N_1+1$ to P, between ith speech input signal line spectral pair frequency and the ith reference speech signal line spectral pair frequency;
means for weighting of the difference by an ith frequency weighting factor, for $i=N_1+1$ to P, wherein ith frequency shifting and weighting factor is the error power spectrum of the speech input signal and a predicted speech input signal at the ith line spectral pair frequency of the speech input signal; and
means for utilizing the shifted difference to classify the speech input signal.

15. The speech recognition system as in claim 14 wherein the distance measure, $d(f,\hat{f})$, between the speech input signal, $f$, and the reference speech signal, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $f_i$ and $\hat{f}_i$ are the ith line spectral pair frequencies in the speech input signal and the reference speech signal, respectively, the constants $\alpha_1$, $\alpha_2$, $\beta_1$ and $\beta_2$ are set to substantially minimize quantization error, and $e_i$ is the error power spectrum of the speech input signal and a predicted speech input signal at the ith line spectral pair frequency of the speech input signal.

16. The speech recognition system of claim 15 wherein the $i=1$ to $N_1$ line spectral pair frequencies are in the 0 to 400 Hz range.

17. The speech recognition system of claim 15 wherein $\alpha_1$ is set to 1.6, $\alpha_2$ is set to 0.68, $\beta_1$ is set to 0.5, and $\beta_2$ is set to 0.25.

18. A method of generating a robust distance measure in a speech recognition system comprising the steps of:
generating P order line spectral pair frequencies for a speech input signal;
determining a difference, for $i=1$ to $N_1$, between the ith line spectral pair frequency and an ith line spectral frequency of a reference speech signal;
shifting the difference, for $i=1$ to $N_1$, by an ith frequency shifting factor to at least partially compensate for frequency shifting of the ith speech input signal line spectral pair frequency by acoustic noise; and
utilizing the shifted difference to classify the speech input signal.

19. The method of claim 18 further comprising the step of:
determining a difference, for $i=N_1+1$ to P, between ith speech input signal line spectral pair frequency and the ith reference speech signal line spectral pair frequency; and
weighting of the difference, for $i=N_1$ to P, by an ith frequency weighting factor.

20. The method of claim 18 further comprising the steps of:
determining respective differences, for $i=N_1+1$ to P, between speech input signal line spectral pair frequencies and corresponding reference speech signal line spectral pair frequencies; and
weighting of the respective differences, for $i=N_1+1$ to P, by respective frequency weighting factors.

21. The method of claim 20 further comprising the steps of:

weighting the differences, for i=1 to $N_1$, by a first weighting constant, $\alpha_1$;

weighting the differences, for i=$N_1$+1 to P, by a second weighting constant, $\alpha_2$;

adding the respective differences together to generate a distance measure between the speech input signal and the reference speech signal; and utilizing the P differences to classify the speech input signal.

22. The method of claim 18 wherein the ith frequency shifting factor is proportional to a power spectrum of a linear prediction error at the ith line spectral pair frequency.

23. A method of robust speech recognition in an automotive environment comprising the steps of:

receiving a speech input signal;

representing the speech input signal with a vector $f$ of P line spectral pair frequencies;

representing a codeword in a quantizer codebook as a vector $\hat{f}$ of P line spectral pair frequencies; and determining a distance measure between the vector $f$ and the vector $\hat{f}$, wherein the distance measure, $d(f,\hat{f})$, is defined by:

$$d(f,\hat{f}) = \sum_{i=1}^{N_1} \alpha_1\left[(f_i - e_i^{\beta 1} - \hat{f}_i)\right]^2 + \sum_{i=N_1+1}^{P} \alpha_2\left[(f_i - \hat{f}_i)e_i^{\beta 2}\right]^2$$

wherein the constants $\alpha_1$, $\alpha_2$, $\beta_1$ and $\beta_2$ are set to substantially minimize quantization error, and $e_i$ is the error power spectrum of the speech input signal and a predicted speech input signal at the ith line spectral pair frequency of the speech input signal.

24. The method as in claim 23 further comprising the steps of:

using the distance measure, $d(f,\hat{f})$, to generate fuzzy distance measures in an fuzzy matrix quantization (FMQ)/hidden Markov model (HMM) speech recognition system.

25. The method as in claim 23 further comprising the steps of:

using the distance measure, $d(f,\hat{f})$, to generate fuzzy distance measures in an FMQ/HMM/neural network speech recognition system.

26. The method as in claim 23 wherein the FMQ includes codebooks for each of u speech recognition system vocabulary words.

27. An apparatus comprising:

a quantizer that receives speech input signal line spectral pair frequencies, that includes at least one codebook having reference speech signal line specral pair frequencies, and that determines a distance measure between an ith speech input signal line spectral pair frequency and an ith reference speech signal line spectral pair frequency, wherein the distance measure, for i=1 to $N_1$, is proportional to (i) a difference between the ith speech input signal line spectral pair frequency and the ith reference speech signal line spectral pair frequency and (ii) a subtraction from the difference of an ith frequency shifting factor to at least partially compensate for frequency shifting of the ith speech input signal line spectral pair frequency by acoustic noise, wherein $N_1$ is greater that or equal to one and less than or equal to P.

28. The apparatus of claim 27 wherein the quantizer is for further determining a distance measure between ith speech input signal line spectral pair frequency and the ith reference speech signal line spectral pair frequency, wherein the distance measure, for i=$N_1$+1 to P, is derived from (i) a difference between the ith speech input signal line spectral pair frequency and the ith reference speech signal line spectral pair frequency and (ii) a weighting of the difference by an ith frequency weighting factor.

29. The apparatus of claim 28 wherein the quantizer is for further determining a distance measure, $d(f,\hat{f})$, between the speech input signal, $f$, and the reference speech signal, $\hat{f}$, is defined by:

$$d(f,\hat{f}) = \sum_{i=1}^{N_1} \alpha_1\left[(f_i - e_i^{\beta 1} - \hat{f}_i)\right]^2 + \sum_{i=N_1+1}^{P} \alpha_2\left[(f_i - \hat{f}_i)e_i^{\beta 2}\right]^2$$

wherein $f_i$ and $\hat{f}_i$ are the ith line spectral pair frequencies in the speech input signal and the reference speech signal, respectively, the constants $\alpha_1$, $\alpha_2$, $\beta_1$ and $\beta_2$ are set to substantially minimize quantization error, and $e_i$ is the error power spectrum of the speech input signal and a predicted speech input signal at the ith line spectral pair frequency of the speech input signal.

30. The apparatus of claim 27 wherein the ith frequency shifting factor is proportional to a power spectrum of a linear prediction error at the ith line spectral pair frequency.

31. The apparatus of claim 27 further comprising:

a quantizer having a codebook having C codewords for generating the distance measure between each of the P line spectral pair frequencies of the speech input signal and each of a plurality of reference speech signals;

a first speech classifier to receive output data based on the distance measures and generate speech classification output data to classify the speech input signal as one of u vocabulary words; and a second speech classifier to receive output data from the first speech classifier and classify the speech input signal as one of the u vocabulary words.

32. The apparatus of claim 31 wherein the second speech classifier is a neural network.

33. The apparatus of claim 31 wherein the quantizer is a fuzzy matrix quantizer further for generating respective fuzzy distance measures between the respective speech input signal and reference speech signal P line spectral pair frequencies using the corresponding generated distance measures; and wherein the second speech classifier is a neural network and the output data is a fuzzy distance measure proportional to a combination of the generated fuzzy distance measures.

34. The apparatus of claim 33 wherein the quantizer is a fuzzy matrix quantizer further for generating an observation sequence of indices indicating the relative closeness between the respective speech input signal and reference speech signal P line spectral pair frequencies; and wherein the second speech classifier is u hidden Markov models and a fuzzy Viterbi algorithm module for determining a respective probability for each of the u hidden Markov models that the respective hidden Markov model produced the observation sequence.

35. The apparatus of claim 27 wherein the speech input signal is represented by P line spectral pair frequencies, where P is a non-negative integer, and the reference speech signal is represented by P line spectral pair frequencies.

36. The apparatus of claim 27 wherein the ith frequency shifting factor is an error power spectrum of the speech input signal and a predicted speech input signal at the ith line spectral pair frequency of the speech input signal.

* * * * *